March 26, 1957  G. R. ERICSON  2,786,484
LUBRICATED VALVE
Filed April 13, 1951  2 Sheets-Sheet 1
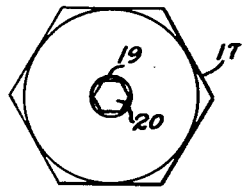
FIG. 3.
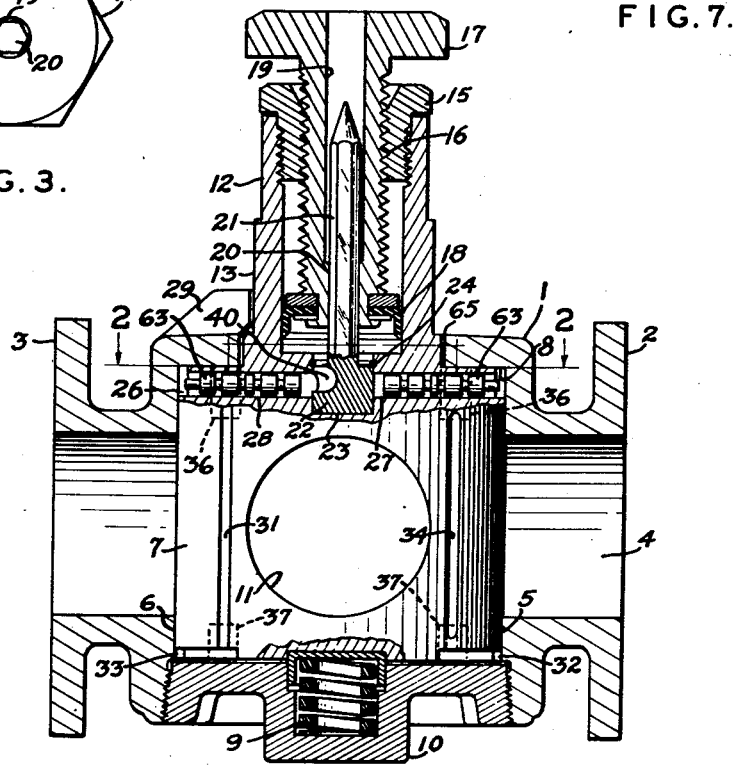
FIG. 7.
FIG. 1.
FIG. 2.
FIG. 4.
INVENTOR.
George R. Ericson March 26, 1957  G. R. ERICSON  2,786,484
LUBRICATED VALVE Filed April 13, 1951  2 Sheets-Sheet 2

INVENTOR.

George R. Ericson ice 2,786,484
Patented Mar. 26, 1957

2,786,484

LUBRICATED VALVE

George R. Ericson, Kirkwood, Mo., assignor, by mesne assignments, to ACF Industries, Incorporated, a corporation of New Jersey Application April 13, 1951, Serial No. 220,749

4 Claims. (Cl. 137—246.14)

This application is in part a substitute for my previously filed application Serial No. 581,096, filed March 5, 1945, for "Improvement in Lubricated Valves," now abandoned.

This invention relates to valves and particularly to lubricating means for plug type valves and the like. Previously designed valves of this character have had certain defects in construction and operation which resulted in imperfect sealing, and difficulty in turning the valve, particularly when there was high pressure in the line and the valve is in closed position.

Numerous attempts have been made to provide for lubricating valves to eliminate these defects, but such attempts have not been entirely successful, partly because no means were provided for insuring delivery of lubricant at the point where it was most needed. Regardless of how much pressure was used to deliver the lubricant, it would escape on the side of the valve opposite the pressure. Some previous designs have used tapered plugs and seats, together with means utilizing lubricant pressure or a cam device for jacking the valve from its seat so as to unstick the valve. These worked very well in cases where the valve was not really stuck, but were not very effective in the case of tightly stuck valves.

Another difficulty which has been experienced with lubricated valves is that chips, grit, or other foreign matter may become mixed with the lubricant and forced into the bearing surfaces in the valve in such a way as to prevent proper sealing. This difficulty is more serious in cases where the valve may be shifted by excess lubricant pressure in such a manner as to cause a separation of the bearing surfaces to act as a safety valve. Such separation may open up a space between the shoulder of the plug and its seat wide enough to permit particles of substantial size to enter and prevent the return of the plug to its seat when the excess lubricant pressure is released, thereby causing failure of the valve by leakage at the neck.

Previously designed plug valves have been provided with both cylindrical and tapered plugs. The tapered plug was expensive and unsatisfactory, while the cylindrical plug has to be so tightly fitted that it was subject to sticking, particularly when the valve was in a closed position with high pressure in the line. This pressure would shift the valve up against the outlet port and would slightly open a crack at the intake side of the valve which would permit the escape of lubricant from the groove system and prevent the development of sufficient pressure at the outlet side to force lubricant between the surfaces and jack the valve sideways against the line pressure.

Another disadvantage of previously designed valves is that they were either subject to loss of lubricant into the pipe line when the valve was in partly open position, or else they could not be lubricated at all in that position.

It is the object of this invention to produce a new and improved valve design in which the above mentioned disadvantages are minimized or eliminated. Other objects and advantages of my invention will appear from the following descriptions accompanying drawings, referring to which:

Fig. 1 is a sectional elevation of a valve embodying one form of my invention, parts being broken away for greater illustration for others.

Fig. 2 is a sectional plan view taken along the line 2—2 of Fig. 1.

Fig. 3 is a detailed plan view showing the upper end of the lubricant screw.

Fig. 4 is a side elevation of a distributing valve.

Fig. 7 is an enlarged detail view showing the filter plug as used in connection with the valve shown in Fig. 1.

Figure 5:
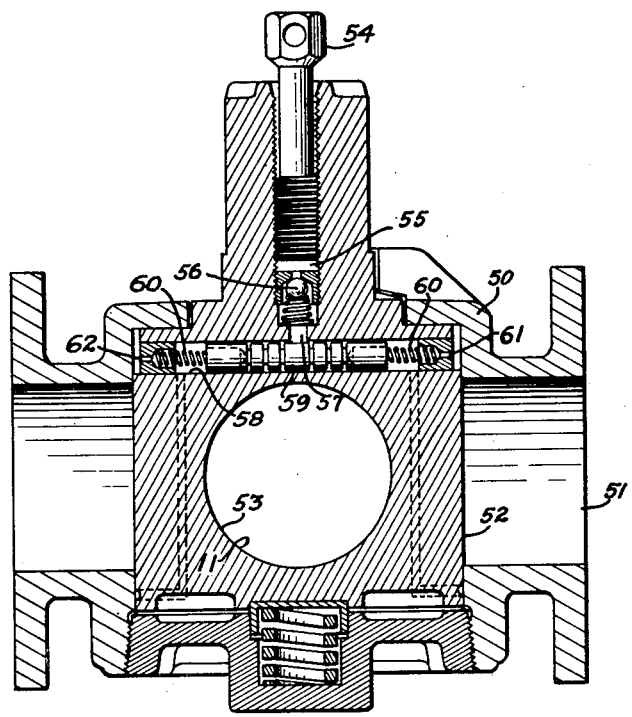
Fig. 5 is a sectional elevation of a modified form of my invention.

The reference numeral 1 indicates a valve body provided with flanges 2 and 3 or other suitable means by which it may be connected into a pipe line. Passageway 4 extends through the body member and is interrupted by a transverse bore providing oppositely disposed cylindrical seat portions 5 and 6. The valve plug 7 is fitted into the cylindrical bore, and held against the shoulder 8 at the top of the bore by means of a spring 9 which is retained by the base plug 10 which closes the lower end of the transverse bore. The plug is provided with a passageway 11 capable of registering with the passage 4 when the valve is in open position. The upper end of the plug is provided with an extension 12 having lugs 13 for receiving a wrench or other suitable turning means.

The extension 12 is provided with a cylindrical bore 14 threaded at its upper end to receive plug 15, which is internally threaded at 16 to receive the lubricant screw 17. The threads of the lubricant screw are of comparatively great pitch, in order to provide a substantial amount of movement of the plunger 18 during each half turn of the lubricant screw. This screw is provided with a bore 19 which is reduced at its lower end to form a hexagonal portion 20 to slidably receive the hexagonal stem 21 of the distributing valve 22. The valve 22 is rotatably fitted to the valve seat 23 in the central portion of the plug and is held in assembled position by the flexible snap ring 24 as shown in Figures 1 and 2. As shown the valve 22 has a cut out portion 40 of a depth sufficient to remove substantially one-half of the valve in the zone of the cut out.

The upper portion of the plug 7 is provided with two separate and oppositely disposed arcuate grooves 25 and 26 which are connected to the valve seat 23 respectively. The valve plug is rotated from open to closed position by turning it 90 degrees as indicated in Figure 2 and suitable stop means 29 are formed on the body to cooperate with the lug portion and thereby limit the opening and closing movements of the valve.

The valve plug is provided with diametrically opposed vertical grooves 30 and 31, in constant communication with the arcuate grooves 25 and 26 respectively. These vertical grooves are also in constant communication with similar arcuate grooves 32 and 33 which underlie the grooves 25 and 26 and the passage 4 at the opposite end of the plug. These grooves are never exposed to the line or uncovered when the valve is moved from open to closed position.

Another pair of diametrically opposed vertical grooves 34 and 35 are formed on the surface of the plug. These grooves are equally spaced circumferentially between the grooves 30 and 31, but do not extend the full length of the plug and may be termed stub grooves. These stub grooves are exposed to the line during movement between open and closed position but are shut off from the lubricating source supply during such movement since they are not directly connected to grooves 25, 26, 32 or 33, but when the valve is in either fully open or fully closed position they are connected to the grooves 25 and 26 as well as to the grooves 32 and 33 by a series of dwarf grooves or ports 36 formed in the body member at the upper end of the bore, and by similar dwarf grooves 37 at the lower end.

In order to prevent the possibility of shavings, grit or other particles of foreign matter getting into the bearing surfaces, the bores 27 and 28 connecting the grooves 25 and 26 respectively with the central seat 23 are made oversize and partially but not completely filled by separate plugs 63 having annular grooves 64 which together with the full diameter portions forming resistance areas with reduced pressure areas between having the effect of blocking and trapping such particles so that they cannot reach the bearing surfaces.

The operation of this form of valves is as follows:

Lubricant is placed in the bore 14 which has a smooth cylindrical surface. The lubricant is supplied in the form of a stick which is very slightly smaller than the bore, which is expanded to fit the bore and expel the air by the impalement of the stem 21, so that substantially no air will be contained in the bore 14 below the piston 18. This is desirable because the presence of a resilient medium in the lubricant chamber would interfere with the equalizing action of the distributing valve. The plug 15 is removed and the lubricant screw 17 is retracted in order to insert the lubricant stick, and then the screw is replaced with the hexagonal stem of the distributing valve fitted into the hexagonal portion 20 of the bore 19. The plug 15 is then tightened to the position shown in Figure 1, while holding 17 stationary, then the lubricant screw 17 may be operated to discharge lubricant into the grooves 27 and 28, into which equal quantities of lubricant are discharged because the cutout portion 40 of the distributing valve registers with only one of the passages 27 and 28 at a time. During one half revolution of the screw 17 the portion 40 registers with groove 28 and is cut off from 27, while during the other half of the revolution it registers with groove 27 and is cut off from 28.

When the valve 7 is in either fully open or fully closed position, the portions 36 and 37 connect the stub grooves 34 and 35 with the grooves 25, 26, 32 and 33 so that with grooves 30 and 31 a complete frame of lubricant is formed around the sealing surfaces 5 and 6, thus forming lubricant reservoirs to keep the cracks between the sealing surface filled and prevent leaking.

When there is sticking on one side of the valve for any reason, such as the force of the line pressure forcing the plug against the body when the valve is closed, the lubricant will be positively forced into the grooves at that side of the valve and squeezed in between the sealing surfaces under full lubricant pressure so as to jack the valve sideways sufficiently to unstick it, and permit rotation if desired. Some lubricant is, of course, supplied to the other side of the valve but the amount is limited or metered by the distributing valve 22 so that no excessive loss of lubricant is permitted, since the valve 22 positively places a shot of the lubricant on each side of the valve as the lubricant screw 17 is turned; therefore, when the necessary high lubricant pressure is being exerted the valve 22 will be in position cutting off the supply of lubricant to the opposite side of the valve at least half of the time.

When the valve is in partially opened position with the stub grooves 34 and 35 exposed to the line, no lubricant may be lost into the line because it cannot be discharged into these grooves. However, the distributing valve can supply lubricant to the rest of the lubricant groove system, and the distribution and jacking action are not otherwise interfered with.

When the lubricant pressure is built up to an excessive degree the plug 7 is forced downwardly by such pressure against the spring 9 sufficiently to permit the upper end of the plug to separate from the shoulder 8 of the bore and allow excess lubricant to escape through the clearance 65 between the stem of the plug and the opening in the shoulder 8.

Figure 6:
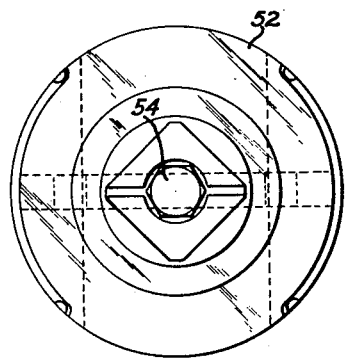
Fig. 6 is a plan view of the plug shown in Fig. 5.
Figure 8:
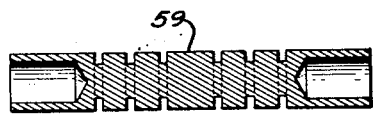
Fig. 8 is an enlarged detail view of the filter and resistance plug as used in the design shown in Fig. 5.

With reference to the form of valve shown in Figures 5 and 6, the valve body 50 has a passageway 51 which is controlled by cylindrical plug 52 in the same manner as in the design shown in Figures 1 to 4 inclusive. Plug 52 is provided with a passage 53, shown in closed position in Figure 5. The lubricant screw 54 may be of simpler form than in the distributing valve type shown in Figure 1, and the lubricant chamber 55 is provided with a check valve 56 through which lubricant is delivered into passage 57 and to transverse bore 58 together forming a T-shaped passage.

The transverse bore contains a single annular grooved resistance plug 59 similar to the plug 63 previously described, the diameter of which is slightly smaller than that of the bore 58, so that a substantial resistance to the flow of lubricant is provided and this resistance varies accordingly with the length of the restricted portion of the bore. The resistance plug 59 is mounted between centering springs 60 in such a manner that excess flow of lubricant toward one end of the bore tends to cause a movement of the valve towards that end, excess flow may occur when the plug is shifted toward the downstream side of the valve, by line pressure. If there is little or no resistance at the outlet 61 or 62 which tends to permit excessive flow then the resistance plug will be carried along with the excess flow of lubricant, thereby decreasing the resistance at the other end and equalizing the lubricant flow. Thus this plug 59 controls the flow of lubricant automatically in the same manner that the valve 22 controlled it mechanically in Figures 1 to 4, also the annular grooves will trap grit, etc. in the same manner as the plug 63. The groove system in the plug may be said to comprise the same grooves as in the design shown in Figure 1 so no further description of these is necessary.

I claim:

1. A lubricated valve comprising a body member having a passage therethrough, a plug member rotatably mounted transversely with respect to said passage and having a port constructed and arranged to register therewith when the valve is in open position, said plug having its side surfaces finished to provide a seating portion adapted to close said passage when the valve is in closed position, axially extending diametrically opposed grooves interrupting the side surface of the plug, a source of lubricant supply, a transversely extending lubricant passage connected centrally thereof to said supply and at its ends to said grooves, a flow restricting plug means shiftable in said lubricant passage and having predetermined clearance therewith, and means normally holding said restricting plug centrally of said transverse passage and yieldable to an increased flow of lubricant in one direction in the transverse passage to allow shifting of the restricting plug in the passage to reduce the flow of lubricant in said direction.

2. A lubricated valve comprising a body member having a passage therethrough and a seating surface surrounding said passage, a plug rotatably mounted in the body and having a seating surface cooperating with said body seating surface and a port constructed and arranged to register with the passage when the valve is in open position, a pair of axially extending grooves interrupting said seating surfaces and disposed substantially diametrically opposite each other, a radially extending passageway connected at its ends to said grooves, a source of lubricant supply connected substantially centrally of said passageway, and a restrictor plug slidably mounted in said passageway centrally thereof, said plug being of a predetermined diameter smaller than said passageway diameter and of a length substantially less than the length of said passageway.

3. A lubricated valve comprising a body member having a flow passage therethrough, a plug member rotatably mounted in said body member, said plug having a flow passage therethrough adapted to register with the body flow passage when in open position, a pair of lubricated grooves at substantially spaced parts of said plug, means including a T-shaped passage having its arms connected to the pair of lubricated grooves and having a lubricant inlet in the stem, a flow resisting plug slidable in the arms of the T-shaped passage, resilient means in the arms and normally biasing the flow resisting plug to the central portion of the passage and centrally beneath the inlet, said flow resisting plug being of less diameter and shorter than the arms but longer than one of the arms, said resilient means being yieldable to permit said flow resisting plug to be moved in one direction by a preponderence of lubricant flow in one of the arms to reduce the flow in the arm and thereby equalize the distribution of lubricant to the grooves.

4. For a lubricated valve, a valving member having valving surfaces to be lubricated, a source of lubricant supply, a transversely extending lubricant passage connected centrally thereof to said supply and at its ends to the valving surfaces to be lubricated, a flow restricting plug means shiftable in said lubricant passage and having predetermined clearance therewith, and means normally holding said restricting plug centrally of said transverse passage and yieldable to an increased flow of lubricant in one direction in the transverse passage to allow shifting of the restricting plug in the passage to reduce the flow of lubricant in said direction.

References Cited in the file of this patent
UNITED STATES PATENTS

| | | |
|---|---|---|
| 1,588,657 | Christensen | June 15, 1926 |
| 2,026,891 | Haun | Jan. 7, 1936 |
| 2,062,250 | Moller | Nov. 24, 1936 |
| 2,147,031 | Hastings | Feb. 14, 1939 |
| 2,254,341 | Zaikowsky | Sept. 2, 1941 |
| 2,265,526 | Henderson | Dec. 9, 1941 |
| 2,348,481 | Knox | May 9, 1944 |
| 2,352,130 | Short | June 20, 1944 |
| 2,504,094 | Turner | Apr. 11, 1950 |
| 2,591,031 | Volpin | Apr. 1, 1952 |
| 2,608,374 | Moorehead | Aug. 26, 1952 |